LINEAR GATE WITH GATING PULSES APPLIED TO COLLECTOR THROUGH THE PRIMARY OF A TRANSFORMER

Filed July 3, 1962

INVENTORS
JOACHIM FISCHER
WILLIAM A. HIGINBOTHAM
ROBERT LLOYD CHASE
BY
ATTORNEY

United States Patent Office 3,182,208
Patented May 4, 1965

3,182,208

LINEAR GATE WITH GATING PULSES APPLIED TO COLLECTOR THROUGH THE PRIMARY OF A TRANSFORMER

Joachim Fischer, Patchogue, Long Island, William A. Higinbotham, Bellport, Long Island, and Robert Lloyd Chase, Blue Point, Long Island, N.Y., assignors to the United States of America as represented by the United States Atomic Energy Commission Filed July 3, 1962, Ser. No. 207,443
3 Claims. (Cl. 307—88.5)

This invention relates to electronic gate circuits and more particularly to gate circuits for transmitting a signal from an input to an output when a control signal is applied and for providing an open circuit in the absence of the control or gate signal.

Electronic gate circuits have been used as electronic switches. They have transmitted a signal from an input to an output when a control signal has been applied to the gate circuit and have behaved as an open circuit in the absence of the control or gate signal. An input signal applied to the output in timed coincidence with the control signal and transmitted to the output without distortion has been called a linear gate. Heretofore, it has bene difficult to provide a linear gate when the input pulse has been of short duration, e.g. from 3–10 mμsec. in the case of radiation detectors, because the gates known heretofore have been primarily coincidence circuits which have been decidedly nonlinear. These have been called "and" gates in computer terminology.

It has been universally recognized, therefore, that it would be advantageous to provide a fast acting linear gate. It is noted that with radiation detectors the output must be linearly related to the input although the gain may be other than unity. For purposes of this description, millimicrosecond (mμsec.) and nanosecond (n-sec.) are used interchangeably as $10^{-9}$ sec.

In one of the fast-acting gate circuits that have been proposed to overcome the lack of speed or linearity of response, a first or input pulse has been conducted through the primary winding of a transformer to ground and corresponding signals have been produced across a secondary winding of the transformer and applied therefrom to the collector of a normally non-conducting, grounded emitter transistor while a gating signal has been applied to the transistor base to saturate the transistor and allow the secondary winding to transmit the corresponding signal to the receptor. Due to the deposit of an excess of carriers in the transistor base by the gate pulse, however, and the slow diffusion of these carriers out of the base after the gate signal has been removed this system has not been sufficiently responsive. Moreover, some of the gate signal has been transferred to the receptor to destroy the linearity of the output signal or other problems have been encountered with this or the other circuits which have been known heretofore.

Accordingly, it is an object of this invention to provide a novel and improved gate circuit of the type described for the production of output pulses corresponding to low level, low impedance input signals.

Another object of this invention is to provide a novel gate circuit for uses in which input and output signals are produced which correspond substantially linearly in amplitude with each other.

A further object of this invention is to provide a novel gate circuit in which an output signal is quickly produced selectively along with two input signals.

In accordance with this invention a transistor is used to couple an input signal into a transformer secondary in response to a gating signal on the transformer primary. To this end the transistor emitter is at ground, the transistor is normally at or below cut-off, the input signal is applied to the transistor base in a direction to turn on current through the transistor while the collector is connected through the transformer winding to a load, and in the absence of a gating signal on the transformer primary, there is no collector potential for the transistor and no transfer to load. Also, the flow and the presence of excess carriers in the base are prevented in the absence of coincident gating and information signals by means including a diode between said collector and said load and a degeneration resistor between said emitter and ground. This additionally improves the linearity of said transistor response to said information and gating signals.

More particularly, in one embodiment this invention contemplates a transistor gate circuit comprising in combination a transistor having a grounded emitter electrode, a base electrode and a collector electrode, means providing a low level negative signal for slightly biasing said base forwardly within cut-off, means providing variable, low level, low source impedance voltage input information signals to said base to make said transistor conduct at a point below the transistor saturation point, gating input signal source means providing rectangular negative gating input signals, a transformer having two primary windings and one secondary winding, one of said primary windings being connected to said gating signal source means on one side and ground on the other side, one side of said secondary winding having an output receptor and the other side of said secondary winding having a diode connected to said collector to form a normally non-conducting loop through said emitter to ground, the coincidence of said information and gating signals selectively connecting said loop through said emitter to ground and producing an output signal in said receptor corresponding to said information signal, and a degeneration resistor connected between said emitter and ground that decreases the gain of said transistor, improves the linearity of said output signals to said input signals and with said diode and low level gating and information signals prevents the accumulation of excessive carriers in said base whereby said output corresponds with said information signals and is produced rapidly in coincidence with said input in the presence of said gating signal.

The above and further objects and novel features of this invention will appear more fully from the following detailed description when the same is read in connection with the accompanying drawings. It is to be expressly understood, however, that the drawings are not intended as a definition of the invention, but are for the purpose of illustration only.

In the drawings where like parts are numbered alike:

In FIG. 1 is a partial schematic drawing of the gate circuit of this invention;

The gate circuit of this invention is adapted for use where a fast linear gate is required to transmit a signal from an input to an output when a second electronic signal is applied and which behaves as an open circuit in the absence of this second or gate signal. One such application is in the detection of radiation from a target exposed to high speed charged particles from a high energy accelerator such as the Brookhaven Cosmotron. In this case the linear gate of this invention is useful in handling the input signals from radiation detectors to give information on the locations of specific ionizations and an indication of the specific ionizations of one or two simultaneous particles traversing a hodoscope. As is well known, a hodoscope is an array of detectors which observes trajectories such as the specific ionization of secondary particles knocked out of a target.

Figure 1:
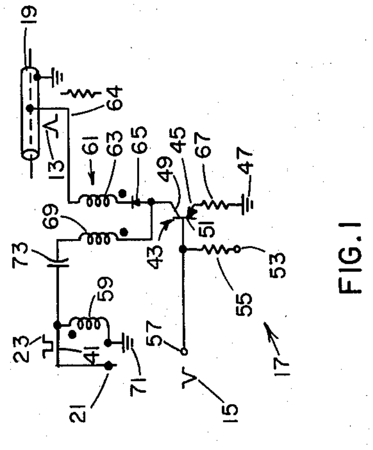

Referring to FIG. 1, in accordance with this invention, the circuit of gate 17 has a transistor 43 which may be a standard PNP junction transistor, such as a 2N 1500 transistor. The transistor 43 has an emitter 45 connected to a ground 47, a collector 49 connected to an output and/or receptor such as delay line 19 and a base 51 having a standard low level, negative voltage source 53 connected to the base 51 through a resistor 55 to slightly bias said transistor forwardly just within cut-off. A low level, low impedance information source 57, such as a radiation detector system, applies low level negative voltage signals 15 to base 51 to turn the transistor on.

A gate signal 23 from a gating trigger circuit 21 flows through transformer primary winding 59 of transformer 61. This, in effect, puts a negative collector voltage on the transistor 43 through equal turn winding 69 of transformer 61 for the duration of the gate signal 23. If a gating signal 23 appears at collector 49 in the absence of an information signal 15 on base 51, no output signal appears in delay line 19 through secondary winding 63 because, in the absence of the information signal 15, the transistor 43 is cut-off and the loop 64 through secondary transformer winding 63 being open (non-conducting to emitter ground 47) this loop 64 and secondary winding 63 cannot conduct in response to a gating signal 23 on the primary winding 59 of the transformer 61. If in coincidence with a gating signal 23 on collector 49, however, base 51 receives a negative information signal 15, the latter effectively short-circuits the transistor 43 to ground 47 by closing the diode formed by collector 49 and emitter 45 and permits the gating signal to flow through diode 65 into secondary winding 63 thus to power an output signal 13 into delay line 19 corresponding to information signal 15. To this latter end the transistor 43 acts as an amplifier which injects a positive output 13 into the main delay line 19 via diode 65 and the secondary equal turn winding 63 of transformer 61. This output current to line 19 is approximately equal to the signal voltage 15 applied to base 51 divided by the resistance of resistor 67 between emitter 45 and ground 47.

In the absence of a gating signal 23 on collector 49, diode 65 blocks the leakage of positive pulses stored in delay line 19, and also blocks the feed-through to delay line 19 of negative information signals 15 on base 51 in the absence of a gating signal 23 on collector 49. The degeneration resistor 67 between emitter 45 and ground 47 is large compared to the dynamic internal resistance of emitter 45 so that the voltage of emitter 45 almost equals the voltage of base 51 for information signals 15 of reasonable amplitude, e.g. up to about 2 or 2.5 volts. Also, the degeneration resistor 67, in the presence of an information signal 15 and the absence of a gating signal 23, tends to limit the presence of excess carriers in base 51.

The limitation of excess carriers decreases the time it takes for the carriers to diffuse out of the base and is in contrast to the heretofore known building-up of hole storage. It has been found that the limitation of excess carriers is critical in obtaining a fast transistor response since the limitation on transistor transient response is based on the diffusion time of minority carriers through the base region, expressed in terms of the diffusion time constant, T*c*. It will be understood that the presence of excess carriers and thus, the transistor transient response depends to some extent on the collector-junction transistor capacitance and in accordance with this invention this value C*c* is relatively small by operating the transistor in a narrow switching-voltage range and by preventing wide swings from cut-off to saturation, for convenience called herein transistor bottoming. To this end the signal 15 is small and advantageously the gating signal 23 equals only the highest expected information pulse 15, e.g. up to about 2.5 volts although it may be slightly higher. These small signals applied to the transistor 43 operate the transistor in the transistor class A or linear region, always at a point below saturation, so that the concentration of excess carriers in the base 51 is negligibly small and the transistor transient response is fast.

Diode 65 inserted between the collector 49 and secondary winding 63 prevents an overshoot in the gating signal 23 of opposite polarity to its normal polarity from going into line 19. The transformer 61 differentiates the gate pulses 23 to some extent so that a signal of reverse polarity will be applied to the collector 49 relative to ground. Also gating signals 23 are applied to collector 49 through two series connected equal turn windings 59 and 69 of transformer 61 in which the primary winding 59 connects the gating signal source 21 to a ground 71. Additionally, middle equal turn primary winding 69 of transformer 61 compensates for gate pulse feed through due to stray capacitances within the transformer 61 and to this end the primary winding 59 connects with middle winding 69 in series so that together they present a signal twice as large as that of the input gate signal 23. This signal is coupled through a small balance capacitor 73 so that the net effect at the collector 49 is to move the connecting side of winding 69, e.g. by just the amplitude of the gate signal 23 when the balance capacitor 73 is just equal to the collector-ground capacitance in the case of no transformer capacitance. In this case, the potential wave form on collector 49 plus that across winding 69 is equal and no output signal appears at the line 19. The actual neutralization value of capacitor 73, however, is adjusted to give minimum feed through for the particular elements involved.

In operation gating trigger source 21 is actuated by a standard radiation detector responsive to the passage of a high energy charged incident projectile particle before the projectile strikes its target to produce secondary radiation detected by the radiation detectors of a hodoscope which produce input signals 15. These input signals 15 have roughly a gaussian shape, are low impedance, and have a duration of from about 3 to 10 m$\mu$sec.

When coincident information and gating signals 15 and 23 occur at the transistor 43, the transistor effectively conducts to ground 47. This closes the transformer loop 64, which extends from line 19 through winding 63, diode 65, collector 49 and emitter 45 to ground 47, applies the gating signal to collector 49 and permits an output signal 13 in delay line 19 corresponding linearly in amplitude variation with input signal 15. In one actual application, the output from the delay line 19 consisted of from 5 to 10 pulses corresponding to two particles in three layers of a hodoscope and these were displayed on an oscilloscope on a total sweep of 5 $\mu$sec. duration.

In summary of the above description, the problem of excess carriers in base 51 is prevented because the transistor 37 is not bottomed (saturated) by input signals thereto and is operated in its class A or linear region, i.e. at a maximum point less than saturation. Moreover, in the presence of an information signal 15 on base 51 and in the absence of a gating signal 23 on collector 49, resistor 67 limits current through transistor 43 also to prevent excess carrier storage in the base 51. Resistor 67, also decreases the gain of transistor 43 to improve the linearity of gate 17, i.e., to make the amplitude variation of output 13 correspond substantially with the amplitude variation of input 15. Diode 65 prevents gate pulse feed through from delay line 19 through collector 49, base 51 and resistor 55 in parallel with the impedance of input signal 15. The connection of middle winding 69 of transformer 61 to primary winding 59 and collector 49 through capacitor 73 cancels gate pulse feed through due to stray capacitances associated with transformer 61.

Transformer 61 is advantageously a bifilar ferroxcube transformer 213T125–3C, capacitor 73 has a value of 5 pf., resistor 55 has a value of 560K, source 53 has a value of −10 v., diode 65 is a 1N570 diode, and resistor 67 varies from 20Ω to 91Ω.

Figure 3:
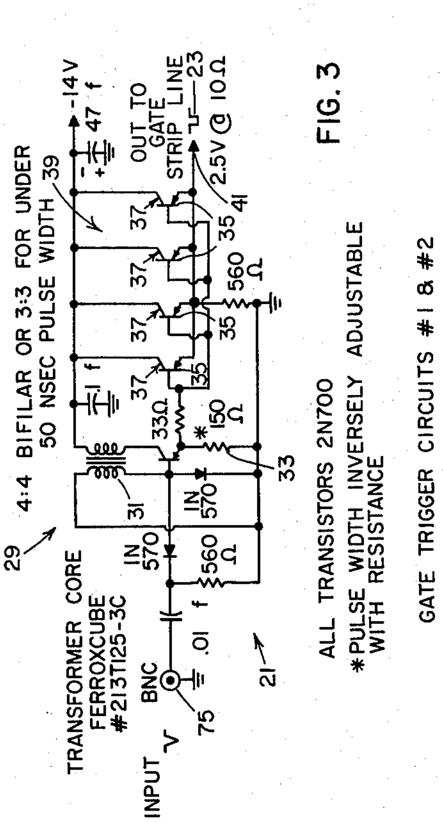
FIG. 3 is a partial schematic drawing of a gate pulse trigger circuit for the gate circuit of FIG. 1.

Any suitable gating trigger source 21 may be provided. Referring to FIG. 3, in one trigger circuit a blocking oscillator type input stage 29 is provided requiring about −3 volts signals, for example, from a radiation detector or a set of particle selecting detectors, sometimes called a counter telescope. Transformer 31 and an emitter resistor 33 set the gate pulse width at about 25 to 70 nsec. This gate signal is emitter-coupled directly to the bases 35 of four transistors 37 connected in parallel as an output emitter follower 39 which in turn is directly connected to a 10Ω terminated strip line 41. Gates 17 connect with each strip line 41 and the gating pulse 23 is a rectangular low level negative pulse of about −2.5 volts.

Figure 2:
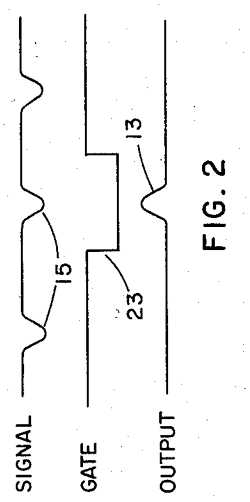
FIG. 2 is a graph showing curves illustrating by means of input and output voltage wave forms the certain operational characteristics of the circuit of FIG. 1.
Figure 4:
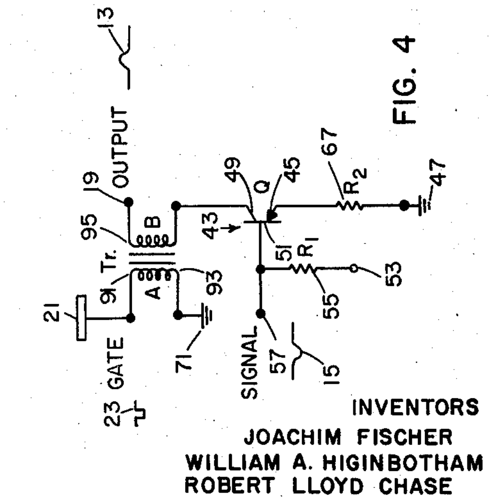
FIG. 4 is a partial schematic of another embodiment of elements of the coincidence circuit of FIG. 1.

In another embodiment of gate 17 shown in FIG. 4, transformer 91 has two windings 93 and 95 instead of the three windings of transformer 61 in FIG. 2. This embodiment does not have the neutralization of the circuit of FIG. 1, but is fast enough acting for many radiation measuring or detecting applications like those described.

It is understood from the above that, resistor 67 may be a variable resistor to adjust the amplitude of the outputs 13 from gates 17.

It is also understood that capacitor 73 may be placed between middle winding 69 and collector 49.

Actual tests have shown that this invention provides a quick acting linear switch and provides an output whose amplitude variation over a wide range corresponds substantially linearly (proportionally) with a low level, low source impedance input signal and a gating signal. Moreover, the specific circuit of this invention depresses the presence of excess holes or carriers and is a simple, suitable, inexpensive, transistor coincidence switch that provides rapid response, avoids regeneration, operates at low impedance levels, suppresses spurious output pulses and avoids other problems known heretofore.

For convenience the values of some of the elements used in the mentioned tests are included in the drawings.

We claim:

1. A fast linear gate circuit, comprising in combination a transistor having a grounded emitter, a base biased forwardly slightly within cut-off to permit low impedance level input signals to said base to turn said transistor on below saturation and a collector, a gating input signal source means, a transformer including first and second primary windings and one secondary winding each having input and output terminals respectively, said first primary winding being connected at its output terminal to ground and at its input terminal to said gating input signal source means, a capacitor connected between said primary winding input terminals and to said collector through said second primary winding, an output connected to said secondary winding output terminal, a diode connected between said secondary winding input terminal and said collector, and a degeneration resistor connected between said emitter and ground whereby the emitter voltage approximates the base voltage for signals of reasonable amplitude and an output current pulse is produced in said output approximately equal to the input signal voltage applied to said base divided by the resistance between said emitter and ground in the presence of a gating input signal from said gating input signal source means to said first primary winding input terminal.

2. A fast linear gate circuit, comprising in combination a transistor having a grounded emitter, a base biased forwardly slightly within cut-off, means for applying low impedance level input signals to said base which turn said transistor on below saturation and a collector, gating input signal source means for providing negative gating input signals, a transformer including first and second primary windings and one secondary winding each having input and output terminals respectively, said first primary winding being connected at its output terminal to ground and at its input terminal to said gating input signal source means, a capacitor connected between said primary winding input terminals and to said collector through said second primary winding, an output connected to said secondary winding output terminal, a diode connected between said secondary winding input terminal and said collector, and a degeneration resistor connected between said emitter and ground that decreases the gain of said transistor, improves the linearity of response of said transistor for providing an output signal in said output corresponding to input signals applied to said base and depresses the existence of excess carriers in said base whereby the response time of said transistor for producing said output signal in said output is fast in the presence of a negative gating input signal from said gating input signal source means to said first primary winding input terminal.

3. A fast linear gate circuit, comprising in combination a transistor having a grounded emitter electrode, a base electrode and a collector electrode, means providing a low level direct current for slightly biasing said base forwardly within cut-off, means providing variable, low level, low source impedance voltage input information signals to said base to make said transistor conduct at a point below the transistor saturation point, gating input signal source means providing rectangular negative gating input signals, a transformer having first and second primary windings and one secondary winding each having input and output terminals respectively, said first primary winding being connected to said gating input signal source means at its input terminal and ground at its output terminal, a capacitor connected between said first primary winding input terminal and the input terminal of said second primary winding and connected through said second primary winding to said collector, the output terminal of said secondary winding having an output receptor and the input terminal of said secondary winding having a diode connected to said collector to form a normally non-conducting loop through said emitter to ground, the coincidence of said information and gating input signals selectively connecting said loop through said emitter to ground and producing a coincident output signal in said receptor corresponding to said information signal, and a degeneration resistor connected between said emitter and ground that decreases the gain of said transistor, improves the linearity of said output signals to said information signals and with said diode and low level gating input and information signals prevents the accumulation of excessive carriers in said base whereby said output signal corresponds with said information signals and is produced rapidly in coincidence with said information signals to said base in the presence of said gating input signal to the input terminal of said first primary winding.

References Cited by the Examiner

UNITED STATES PATENTS 2,987,627 6/61 Eckert ---------------- 307—88.5

OTHER REFERENCES

"Basic Theory and Application of Transistors," Dept. of The Army Technical Manual TM 11-690, March 1959, page 115, 1st column.

"Anding Via Transformer Logic," by D.W. Waldenmayer, IBM. Technical Disclosure Bulletin, vol. 4, No. 9, February 1962, pages 50 and 51.

JOHN W. HUCKERT, *Primary Examiner.*

ARTHUR GAUSS, *Examiner.*